United States Patent [19]

Kretschmer, Jr. et al.

[11] 4,404,562
[45] Sep. 13, 1983

[54] LOW SIDELOBE LINEAR FM CHIRP SYSTEM

[75] Inventors: Frank F. Kretschmer, Jr., Laurel; Bernard L. Lewis, Oxon Hill, both of Md.

[73] Assignee: The United States of America as represented by the Secretary of the Navy, Washington, D.C.

[21] Appl. No.: 180,548

[22] Filed: Aug. 25, 1980

[51] Int. Cl.³ .............................................. G01S 13/28
[52] U.S. Cl. ............................................... 343/17.2 PC
[58] Field of Search ......... 343/5 NQ, 5 FT, 17.2 PC, 343/17.2 R

[56] References Cited

U.S. PATENT DOCUMENTS

| | | | |
|---|---|---|---|
| 3,176,296 | 3/1965 | Adams | 343/17.2 PC |
| 3,987,285 | 10/1976 | Perry | 343/5 FT X |
| 4,003,054 | 1/1977 | Goldstone | 343/17.2 PC X |
| 4,005,423 | 1/1977 | Webb | 343/17.2 PC |
| 4,156,876 | 5/1979 | Debuisser | 343/17.2 PC |
| 4,237,461 | 12/1980 | Cantrell et al. | 343/5 FT |
| 4,359,735 | 11/1982 | Lewis et al. | 343/17.2 PC |
| 4,359,736 | 11/1982 | Lewis | 343/17.2 PC |
| 4,373,190 | 2/1983 | Lewis et al. | 343/17.2 PC X |

FOREIGN PATENT DOCUMENTS 2825292 12/1979 Fed. Rep. of Germany ... 343/5 NQ
2024547 1/1980 United Kingdom ............. 343/5 FT Primary Examiner—T. H. Tubbesing
Attorney, Agent, or Firm—Robert F. Beers; William T. Ellis

[57] ABSTRACT

An improved FM pulse compression system which has low range-time sidelobes and is doppler tolerant. This system is implemented by using an analog-type linear FM modulated transmission pulse and processing the echo from this pulse by means of baseband sampling at the Nyquist sampling rate and then compressing this sampled signal by means of a discrete phase compression circuit. In brief, the present invention comprises a receiver for receiving the FM echo pulse, a sampling and holding circuit for sampling the echo at baseband at the Nyquist sampling rate and then converting to IF, and a discrete phase compression circuit for compressing the appropriate number of sampled outputs from the sampling and holding circuit. If an echo is properly indexed in the phase compression circuit, then a short pulse with a relatively high amplitude is generated.

19 Claims, 7 Drawing Figures

LOW SIDELOBE LINEAR FM CHIRP SYSTEM

BACKGROUND OF THE INVENTION

This invention relates generally to radar processing systems, and more particularly to pulse compression systems which are doppler tolerant.

It is well known in the art of pulse radar systems that in order to obtain a good detection capability against a background of noise, a pulse with a large energy content must be transmitted. This larger energy content may be obtained by either transmitting a pulse with a large peak power and/or with a long pulse duration. If the pulse width is limited to small values because of the desire to obtain good range accuracy or resolution, the required energy pulse must be obtained with a large peak power. However, in many applications it is not possible to obtain a peak power as large as one might desire because of voltage-peak limitations somewhere in the system. In such a peak-power-limited radar system, the required energy can be obtained only by transmitting a longer pulse. In order to retain radar resolution (range) when transmitting a long pulse with a high average power content, pulse compression techniques are employed. The use of such pulse compression techniques permit the transmitted pulse to be made as long as desired while retaining an optimum range resolution.

Although there are a wide variety of pulse compression techniques available today, those techniques utilizing either phase or frequency coding are the most energy-efficient. However, with the exception of the Frank phase code (actually a variation of frequency coding) all phase-based techniques are very doppler intolerant. This doppler intolerance arises because of target motion toward or away from the radar system. Such motion tends to change the phasing of the transmitted code and tends to prevent optimum compression unless the system is doppler corrected utilizing multiple decoders. In addition, phase coding and decoding systems require receiver bandwidths much wider than the reciprocal of the compressed pulse length in order to provide low-range time sidelobes. By way of information, the doppler tolerance of a pulse compression technique referred to above is measured by the loss in energy transfer efficiency with doppler shift.

However, it has been found that frequency coding techniques utilizing linear or an approximation to linear frequency modulation are very doppler tolerant. This doppler tolerance is the result of the fact that a doppler shift on any echo from a frequency modulated pulse will simply translate all of the frequency components of the pulse by about the same relative amount in the same direction. As a consequence, all of the frequencies within the radar pass band will still exit from the dispersive delay line at the same relative time to form a short pulse. However, the output pulse will occur at an absolute time different from that which would have resulted in the absence of doppler. The later effect is called range-doppler-coupling.

The major drawback to the use of frequency coding is that the pulse compression techniques presently available limit the pulse compression ratios that can be achieved and produce unnecessarily high sidelobes. In fact, when the dispersive delay lines, i.e., where the delay is proportional to frequency, are employed to compress such long frequency modulated pulses, the energy loss becomes quite significant for larger frequency dispersions. Such compressors produce $(\sin x)/x$ time functions without amplitude weighting. The sidelobes present in the $(\sin x)/x$ compressor time function can, of course, be reduced via conventional amplitude weighting of the input waveform, but such weighting broadens the mainlobe and reduces the response to targets.

OBJECTS OF THE INVENTION

Accordingly, it is an object of the present invention to reduce the range time sidelobes of a doppler tolerant FM pulse compression system.

It is a further object of the present invention to maximize the mainlobe to sidelobe ratio in a doppler tolerant FM pulse compression.

It is yet another object of the present invention to provide a doppler tolerant FM pulse compression system which has both low range time sidelobes and the capability of an unlimited uncompressed pulse length.

It is a further object of the present invention to increase the energy efficiency and the ease of instrumentation of a doppler tolerant FM pulse compression system.

Other objects, advantages, and novel features of the present invention will become apparent from the detailed description of the invention, which follows the summary.

SUMMARY OF THE INVENTION

The present invention provides an improved FM pulse compression system which has low range-time sidelobes and is also doppler tolerant. This system is implemented by using an analog-type linear FM modulated transmission pulse and processing the echo from this pulse by means of baseband sampling at the Nyquist sampling rate and then compressing this sampled signal by means of a compression circuit. In brief, the present invention comprises a receiver for receiving the echo signal from a frequency modulated transmitted pulse, a sampling and holding circuit for sampling the echo at baseband at the Nyquist sampling rate, and a circuit for compressing the appropriate number of sampled outputs from the sampling and holding circuit such that when an echo is properly indexed in the circuit then a short pulse with a relatively high amplitude waveform is generated.

BRIEF DESCRIPTION OF THE PREFERRED EMBODIMENT

Figure 1:
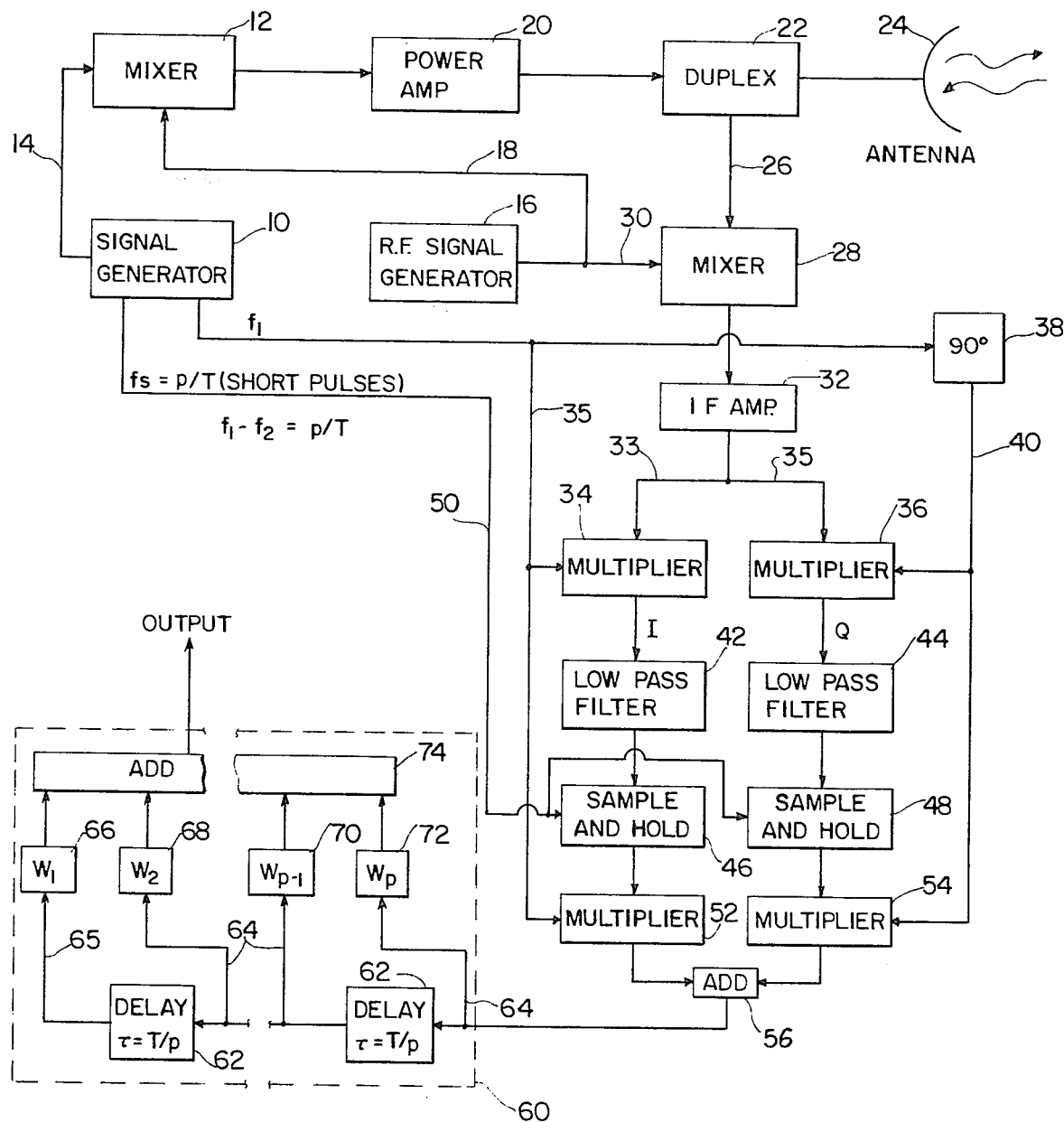
FIG. 1 is a block diagram representation of a pulse compression system in accordance with the present invention.
Figure 2:
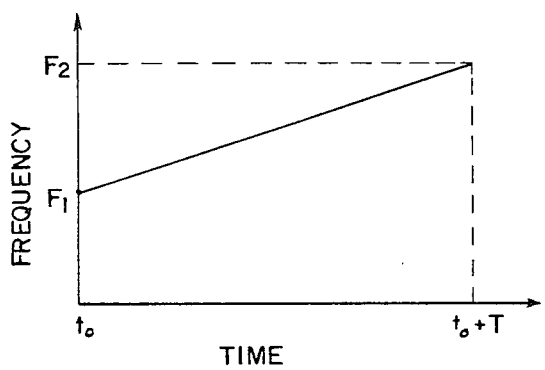
FIG. 2 is a graphical plot of the transmitted pulse in terms of frequency versus time.

Referring now to the drawings, FIG. 1 is a block diagram representation of the preferred embodiment of the present invention. In this figure a signal generator 10 generates an intermediate frequency signal having a frequency which varies linearly with time from a frequency $f_1$ to a frequency $f_2$ as time varies from an arbitrary time to $t_o+T$. This linearly varying frequency modulation generated by the signal generator 10 is shown in FIG. 2. The bandwidth defined by $f_2$ and $f_1$ equals the pulse compression ratio p divided by T. This linearly frequency modulated waveform is supplied to the mixer 12 via line 14 wherein it is mixed up to radio frequency by heterodyning it with an rf signal supplied by rf signal generator 16 via line 18. The resultant rf signal is amplified by power amplifier 20, passed through a standard duplexer 22, and radiated from a radar antenna 24.

Echos received by the antenna 24 are supplied by the duplexer 22 to the mixer 28 via the line 26. The mixer 28 beats or heterodynes this echo signal with the rf signals supplied by rf signal generator 16 via line 30 in order to obtain the intermediate frequency echo signal varying from $f_1$ to $f_2$. The resultant intermediate frequency signal is amplified in an intermediate frequency amplifier 32 with a bandwidth from $f_1$ to $f_2$ centered on the frequency $(f_2+f_1)/2$.

At this point in the circuit both the transmission and the reception processing have been analog in nature. Both the transmitted signal and its echo return are smooth, linearly frequency modulated signals. Because there are no sharp digital steps in the signal, the bandwidth of the processing equipment may be relatively limited yet the signal may be followed with relative accuracy. However, in order to obtain the low sidelobes characteristics of digital processing, it is desired at this point in the circuit to sample the echo signal at a predetermined sampling rate.

It has been found that a sampling of the echo signal at the Nyquist rate for the information baseband will provide the lowest possible sidelobe to mainlobe ratio. The Nyquist rate is defined as twice the reciprocal of the radar information bandwidth, or in this case $2/(f_2-f_1)$ or 2 T/p. Where conversion to I and Q signals is used, then the Nyquist rate would be $1/(f_2-f_1)$ or T/p.

In order to obtain the information baseband, the intermediate frequency echo signal from amplifier 32 must be beat or heterodyned with a local oscillator (L.O.) intermediate frequency signal. However, because the intermediate frequency echo signal could have any phase at the time of reception by the receiver, proper processing requires the generation of I and Q video signals in phase quadrature in order to obtain both amplitude and phase information. Accordingly, an I channel and a Q channel are provided for generating baseband signals and sampling those signals at the Nyquist rate. The I channel comprises a multiplier 34 for beating or heterodyning the intermediate frequency echo signal on line 33 from amplifier 32 with an L.O. intermediate frequency signal from signal generator 10 via line 35. The use of an L.O. signal from generator 10 allows coherent detection at the information baseband I signal. Likewise, a multiplier 36 in the Q channel multiplies the intermediate frequency echo signal on line 35 with an L.O. intermediate frequency signal from the signal generator 10 shifted in phase by 90° by the phase shifter 38 and provided via line 40. This multiplication allows the coherent detection of the video Q signal.

Figure 3:
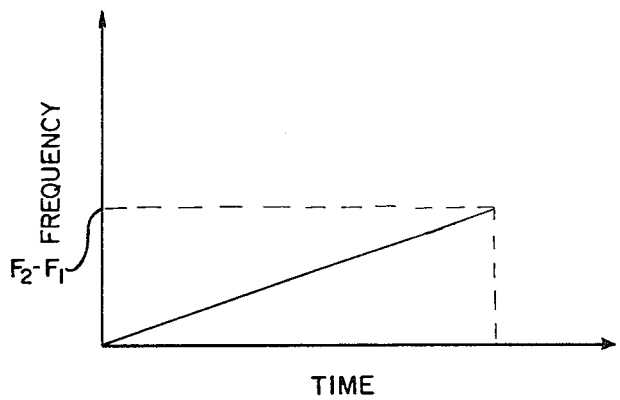
FIG. 3 is a graphical plot of the received echo pulse after conversion to baseband in terms of frequency versus time.

The L.O. intermediate frequency signal should preferably be within the band defined by $f_2$ and $f_1$ or adjacent thereto in order to obtain the baseband signal. The utilization of an L.O. intermediate frequency signal significantly outside this band would give rise to rapid phase shifts with time. (Phase shift $\phi=(2\pi)$ . (Frequency difference between signals being beaten) . (time that frequency difference lasts). If the phase shifts are too rapid with time, then the phase shifts in the subsequent portions of the circuit would be required to be very accurate. For example, a one megacycle frequency difference between the signals being beaten lasting for a microsecond would yield a phase shift of $2\pi$ every microsecond. Thus, if a tap delay line which is inaccurate by a fraction of a microsecond or more is used for compression in a subsequent portion of the circuit, then the phase shifts in the taps for the tap delay line would be inaccurate by some significant amount. Accordingly, the L.O. intermediate frequency is preferably chosen to be within the frequency band defined by the limits $f_2$ and $f_1$. For purposes of explanation only and not by way of limitation, the L.O. intermediate frequency signal is chosen as $f_1$ in the discussion that follows. Accordingly, when the intermediate frequency echo from the amplifier 32 is multiplied by the L.O. intermediate frequency $f_1$, then the echo will yield a frequency response varying from 0 to $f_2-f_1$ as shown in FIG. 3. The I and Q video signals are then passed through low pass filters 42 and 44, respectively. These low pass filters may be optimally adjusted to just pass baseband pulses of length T/p. The outputs of these low pass filters 42 and 44 are applied to sample and hold circuits 46 and 48, respectively.

Figure 4:
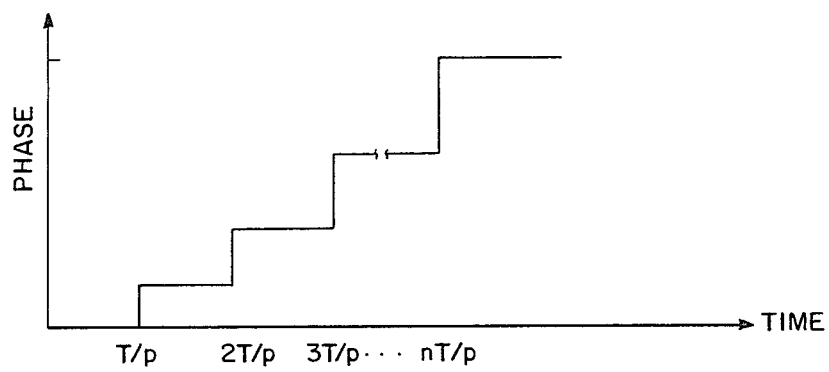
FIG. 4 is a graphical plot of the received echo signal after sampling in terms of frequency versus time.

In determining the optimum sampling rate for the sample and hold circuits there are two competing factors which require consideration. In the ideal situation when an echo pulse is received, the sampling would begin at the beginning of the echo pulse. However, no provision in the circuit has been made for ensuring that the sampling will begin at the beginning of the echo pulse. Accordingly, there may be a sampling error by as much as ½ of a sampling period. Thus by reducing the sampling period or increasing the sampling rate the sampling error will be proportionately reduced. However, it has been found that very high sampling rates will raise the next adjacent sidelobe to the mainlobe to within 13 dB of the mainlobe. The Nyquist sampling rate is the minimum sampling rate which will allow the circuit to reconstruct all of the information for a given bandwidth. This rate is generally two times the reciprocal of the bandwidth, or in the case of I video and Q video signals it is equal to the reciprocal of the bandwidth itself. The use of Nyquist rate sampling will provide an acceptable sampling error rate and will also provide a maximized mainlobe to sidelobe ratio. In the present example, the bandwidth of the I and Q video signals is $f_2-f_1$ which equals p/T. Accordingly, the sample and hold circuits 46 and 48 are driven by short pulses repeated at a rate of p/T with a length short compared to T/p. The sampling pulses may be supplied via line 50 from the signal generator 10. The sample and hold circuits 46 and 48 hold their sample values for a time T/p between the samples. FIG. 4 is a graph of the output from the sample and hold circuits in terms of phase vs. time.

In order to properly phase shift the signals in the subsequent compression circuit to be discussed below, it is required to beat the baseband I and Q video signals back up to an intermediate level. More specifically, the amount of phase shift generated by the phase shift elements in the subsequent compression circuit will depend to some extent, on the frequency of the signal being operated upon. If these phase shifters were to operate on the I and Q video signals themselves, then significant phase shift errors could occur from one end of the information baseband to the other. In order to avoid this problem, these baseband signals are beat up to intermediate frequency level which is high enough with respect to the bandwidth of the information so that the phase shifting of the signal will give approximately equal phase shifts across the information baseband, i.e., phase error will be negligible across the information baseband.

Accordingly, the I and Q samples from the sample and hold circuits 46 and 48 are used to modulate multipliers 52 and 54, respectively. An L.O. intermediate frequency signal is supplied to multiplier 52 in the I channel which will operate to balance modulate that intermediate frequency signal with the sampled I signal from the sample and hold circuit 46. This intermediate frequency signal may be the signal $f_1$ supplied via line 35. Likewise, the multiplier 54 in the Q channel is supplied with an L.O. intermediate frequency signal in quadrature with the intermediate frequency signal supplied to the multiplier 52. This quadrature L.O. intermediate frequency signal is balanced modulated by the sampled Q output signal from the sample and hold circuit 48. Again, this L.O. intermediate frequency signal may by the L.O. intermediate frequency signal $f_1$ shifted in phase by 90° and supplied via line 40. The intermediate frequency signal output from multipliers 52 and 54 are then added together in an addition circuit 56 and the sum supplied to a compression circuit 60. In this instance, the purpose of the compression circuit is to take successive samples in time, and weight those samples such that when a received signal is properly indexed in the circuit, then its output will be a short pulse with a significant amplitude, i.e., a compression operation. In the present circuit when the echo signal is properly indexed, those samples will be taken over the length T of the echo pulse and they will be weighted such that the compression circuit will yield a single output pulse with a time length equal to T/p and with an amplitude p times greater than the peak output of any single sample. Such a compression operation will yield a radar echo pulse with low range-time-sidelobes.

In order to implement the compression circuit 60 in an economical and efficient manner, a simple tap delay line may be utilized. The length of the tap delay line will, of course, be determined by the uncompressed length T of the transmitted pulse. The number of taps on the delay line is generally determined by the number of samples taken in the sample and hold circuits 46 and 48. Accordingly, the present delay line may be composed of a series of p-1 cascaded delay elements 62 each equal to a delay of $\tau = T/p$. A signal tap 64 may be taken before each delay element 62 and a final tap 65 may be taken after the last delay element for a total of p signal taps. By way of example, the delay elements 62 may be formed by cable or standard RC transmission line cut to the proper length. Equal amounts of signal will be obtained from each tap by setting the tap impedances in the well known manner.

If the original transmitted signal had contained a single frequency across the length of the pulse, then the signals from these p taps could be added without further processing to yield the compressed pulse. However, because the frequency varies linearly with time during the length of the pulse, the signals on the individual signal taps must be progressively phase shifted back into phase. Accordingly, in order to bring the signals on the various signal taps into phase with each other, phase weighting elements 66, 68, 70 and 72 are provided in the different signal taps. The phase weights to be set in these individual phase shifting elements may be determined as follows. For purposes of the present discussion, the phase of the signal on the last signal tap 65 will be taken as the reference. Accordingly, the signal weight box 66 will provide a phase shift of zero. The phase shifts for the other signal wave may be calculated as follows:

The frequency difference between the signals on any two taps $f_{diff}$ is $$f_{diff} = \frac{df}{dt} t$$

For a linear frequency modulation, as in this instance, df/dt = a constant k or $$f_{diff} = kt$$

also $$f_{diff} = \frac{d\phi}{dt} \text{ where } \phi = \text{phase of the signal}$$

$$\phi_{diff} \text{ between taps} = \int_0^t 2\pi \cdot f_{diff} dt$$

$$= \int_0^t 2\pi \cdot kt \cdot dt$$

$$= \pi kt^2$$

The constant k is found to equal the slope of the frequency vs time transmission characteristic or $(f_2 - f_1)T = B/T$. Thus, the phase weight boxes will provide the following phase shifts $$\phi_1 = 0$$

$$\phi_2 = \pi \left(\frac{B}{T}\right)(t^2) = \pi \left(\frac{B}{T}\right)\left(\frac{T}{p}\right)^2 = \pi/p$$

$$\phi_{p-1} = \pi \left(\frac{B}{T}\right)[(p-2)(T/p)]^2$$

$$\phi_p = \pi(B/T)[(p-1)(T/p)]^2$$

By way of example and not by way of limitation, these phase shifting weights may comprise BNC cable or twisted pairs cut to the proper length in order to obtain the prescribed phase shifts.

When the linear variation of the frequency of the signal with time has been taken into account, then the output from the weights 66 through 72 should all be in phase when a received echo pulse is properly indexed in the delay line. Accordingly, the weighted signal output from the weights 66 through 72 are added together in an adding circuit 74. The output from this adding circuit 74 will have a magnitude p times greater than the peak output from any tap on the delay line and will last for a time equal to T/p when an echo signal is properly indexed in the delay line.

In essence, the foregoing system can be described as a hybrid system wherein an analog frequency modulation is transmitted and received via analog circuits which may have narrow band characteristics. When the echo pulse has been received however, it may then be processed digitally via sampling to allow both narrow band operation and low range-time-sidelobes.

Figure 5:
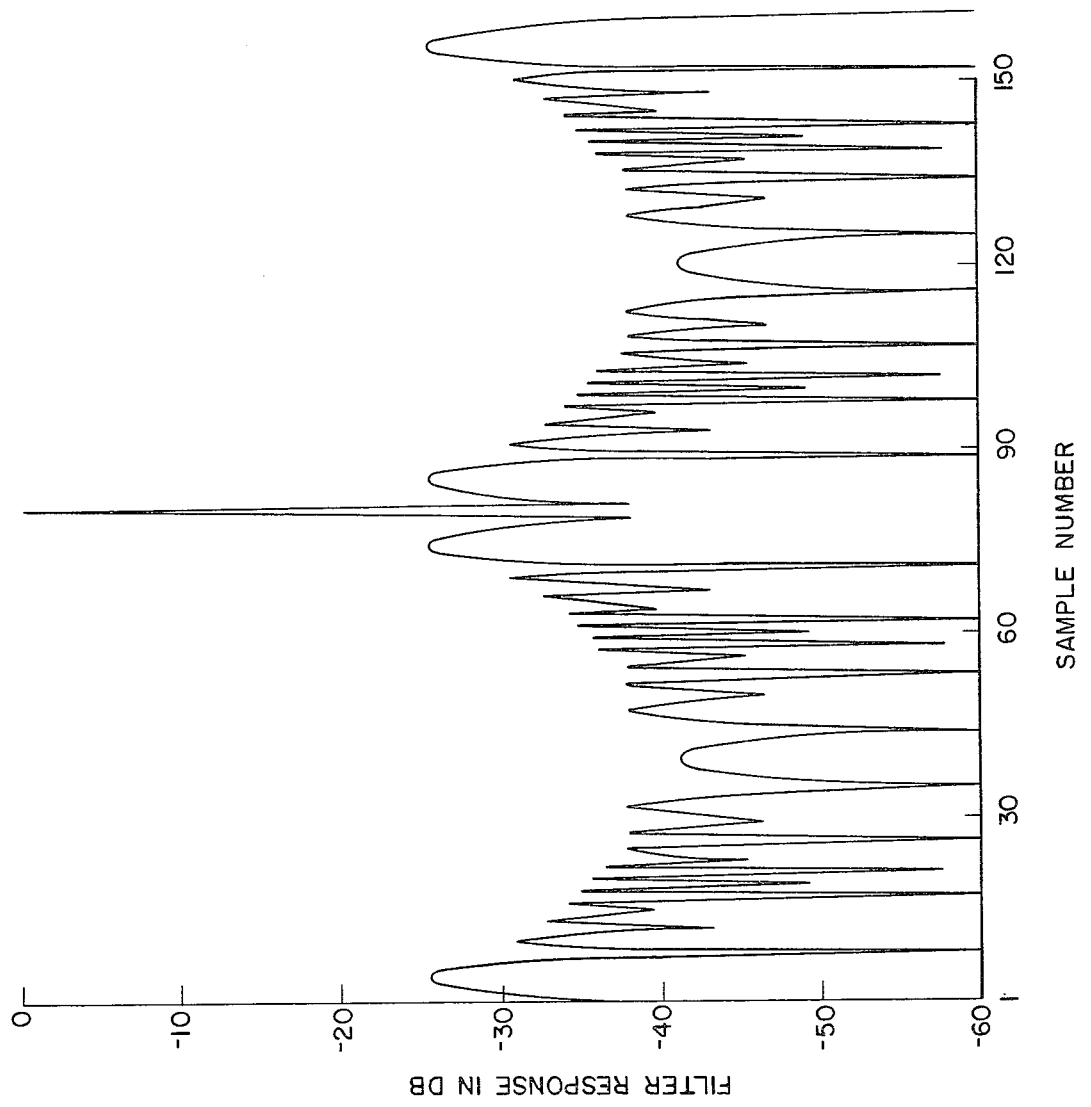
FIG. 5 is a graphical plot of the filter response in dB versus the sample number with a compression ratio p equal to 81.

FIG. 5 is a computer plot of the response of the invention disclosed in FIG. 1 to an echo from an isolated point target with a pulse compression ratio of 81. It should be noted that the highest sidelobe in the plot is approximately 26 dB down from the mainlobe and the mainlobe has not been broadened or reduced. Under these same conditions, a conventional compressor would have produced adjacent sidelobes only 13 dB down from the mainlobe with other sidelobes falling off as (sin x)/x.

Figure 6:
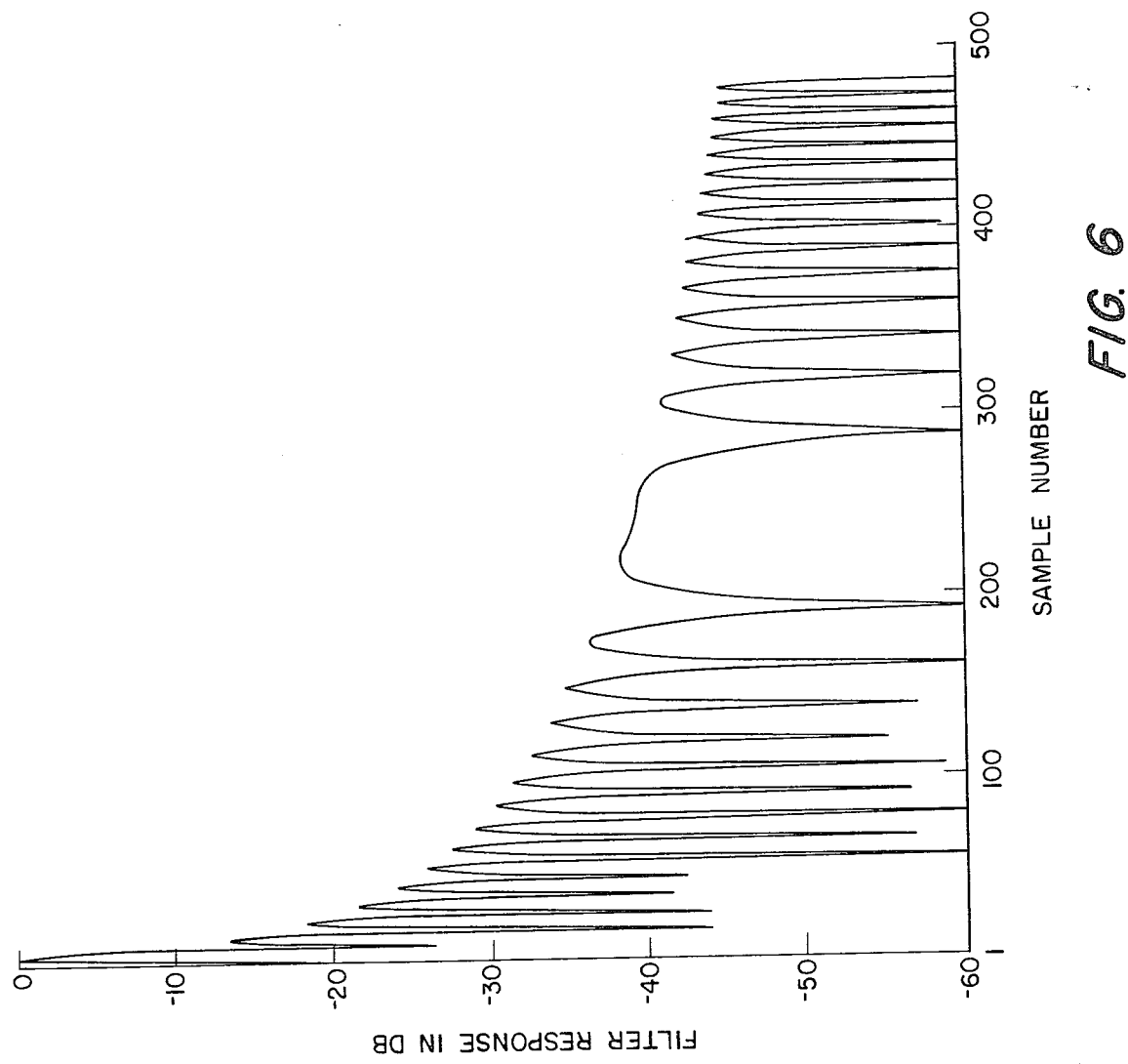
FIG. 6 is a graphical plot of the filter response in dB versus the sample number of the response of the circuit of FIG. 1 if too high a sampling rate $R_s$ is employed.

FIG. 6 is a computer plot of the invention disclosed in FIG. 1 when too high a sampling rate is employed in the sample and hold circuits. In this case the sampling frequency $f_s$ was taken to be seven times the Nyquist rate p/T and the number of taps on the delay line and the number of weighting boxes were increased by a factor of seven over the optimum number p. It can be seen that the sidelobes adjacent to the mainlobe are approximately only 13 dB down from the mainlobe.

Figure 7:
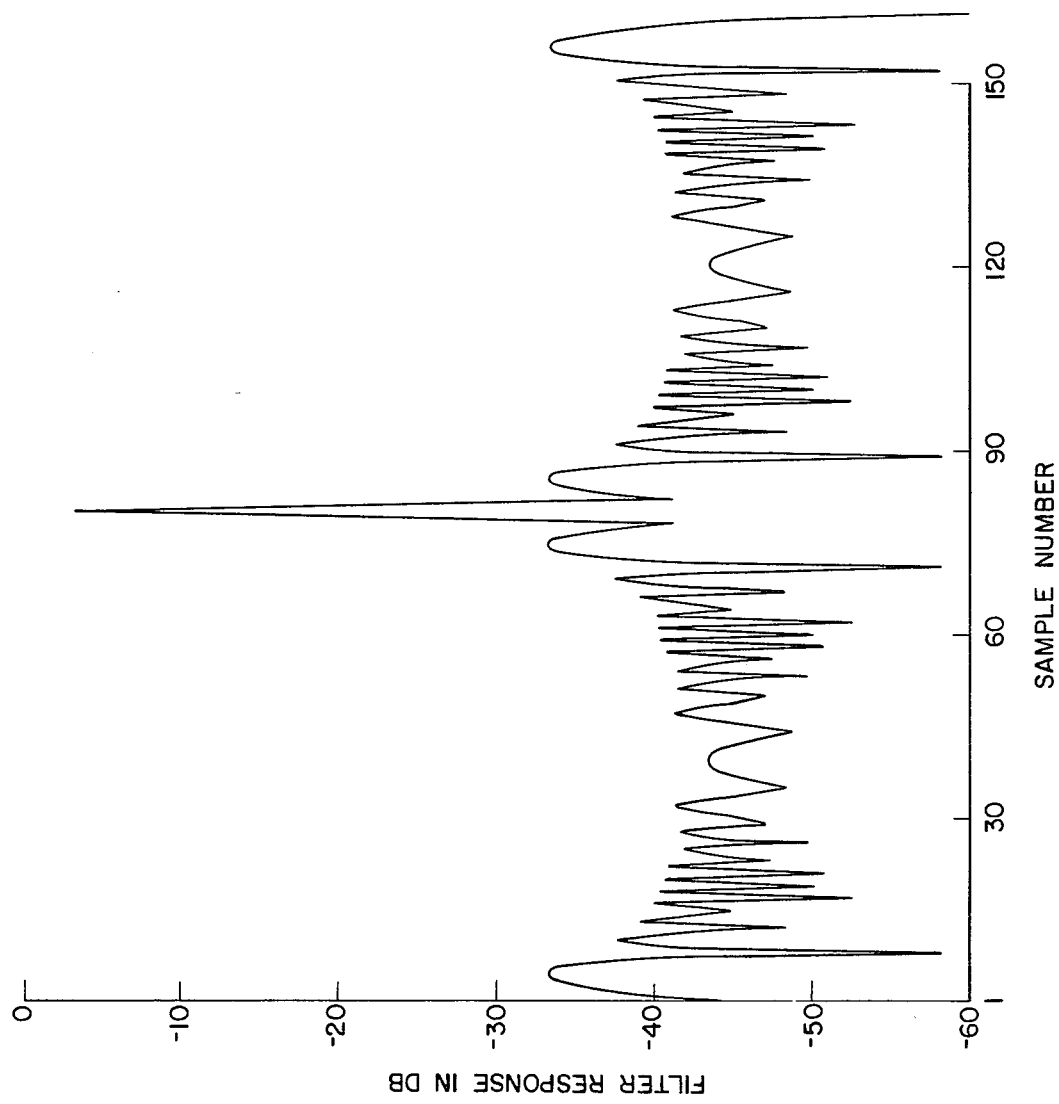
FIG. 7 is a graphical plot of the filter response in dB versus the sample number for the circuit of FIG. 1 when amplitude weights are added to the weight boxes in FIG. 1.

It has been found that the sidelobes for the circuits disclosed in FIG. 1, when sampled at the Nyquist rate (FIG. 5) can be further reduced by adding amplitude weights to the weight boxes W in FIG. 1. FIG. 7 is the computer plot of the response of this invention to an echo when amplitude weighting in accordance with a cosine on a pedestal with an edge illumination 8 dB down is utilized in the weight boxes W. It can be seen that the mainlobe has dropped by only 2 dB while the highest sidelobes have dropped by approximately 7 dB.

It may be of interest to note that the non-amplitude weighted mainlobe to sidelobe ratio of the invention disclosed in FIG. 1 increases with pulse compression ratio p in the same way as Frank coding operates. Thus, the mainlobe to sidelobe ratio will be approximately equal to $\pi^2 p$.

Thus, the present invention when operated with a Nyquist sampling rate will yield much lower range-time-sidelobes due to the digital sampling technique utilized at the receiver. Moreover, because signal band mismatching has been minimized during the transmission and reception operations, very little energy is lost thus yielding a higher energy efficiency than prior art compression systems. Additionally, it should be noted that the use of the linear frequency modulated transmission allows an unlimited uncompressed pulse length. Finally, it should be noted that this hybrid type system lends itself to an ease of instrumentation not readily available in prior art processing systems.

It should also be noted that although the compression circuit of the present invention has been disclosed as having discrete elements, the invention is not limited to such a design. For example, outputs of the sample and hold circuits 46 and 48 could be digitized with analog to digital converters prior to the conversion of the I.Q. video signal back to an intermediate frequency. The delay line elements 62 could then be made digital in I and Q and digital weighting could be used in the signal tap output. The advantage to digital compression would be the avoidance of any signal reflection which might occur both in the cable used for the delay element 62 and in the phase shifters 66 through 72, because the shift registers which would be utilized to perform these digital operations are one way lines which would not have reflection. However, such digital processing is significantly more expensive than the use of simple cable delay elements and phase shifters.

It should be noted that although the L.O. intermediate frequency signal was chosen as $f_1$ for convenience, the invention is not limited thereto. For example, if this L.O. signal was chosen as $f_2$, then the slope of the I and Q video baseband signals would merely be reversed so that the highest frequency would occur first and the lowest frequency would occur last in the signal pulse. In order to accommodate this change in the L.O. signal, the phase weight applied to the weighting boxes 66 through 72 would merely be inverted in order.

Obviously many modifications and variations of the present invention are possible in light of the above teachings. It is therefore to be understood that within the scope of the appended claims the invention may be practiced otherwise than as specifically described.

What is claimed and desired to be secured by Letters Patent of the United States is:

1. A pulse compression system for receiving and compressing the echos of long frequency modulate (FM) pulse waveforms of electromagnetic energy propagated by a transmitter comprising:
   means for receiving a long FM pulse signal including means for converting the received signal to an intermediate frequency (I.F.) signal;
   means for sampling the output signal from said receiving means and holding said sampled receiver output signal as its output until the next sampling time,
   wherein said sampling and holding means comprises
      a first electrical channel for generating a baseband I signal from said I.F. signal output from said converting means and sampling this signal at the Nyquist rate for said baseband signal and then reconverting this I signal back to an I.F. signal;
      a second electrical channel for generating a baseband Q signal from said I.F. output from said converting means and sampling this signal at the Nyquist rate for said baseband signal and then reconverting this sampled Q signal back to an I.F. signal; and
      first adding means for adding the I.F. signal outputs from said first and second electrical channels; and
   discrete phase correlation compression means for compressing a predetermined number of sampled outputs from said first adding means in said sampling and holding means into a short pulse.

2. A pulse compression system as defined in claim 1, wherein said discrete phase correlation compression means includes means for compressing a linear FM pulse waveform.

3. A pulse compression system as defined in claim 1, wherein each of said electrical channels comprises:
   first multiplier means for multiplying the I.F. signal from said converting means with a local oscillator signal in said first electrical channel to obtain the I baseband signal in the first electrical channel and with a local oscillator signal shifted in phase by 90° in said second electrical channel to obtain the Q baseband signal in the second electrical channel;

filter means for filtering the output signal from said first multiplier means;

a sample and hold circuit for sampling the output signal from said filter means at the Nyquist rate; and second multiplier means for multiplying the sampled I baseband signal in said first electrical channel by the local oscillator signal and the sampled Q baseband signal in said second electrical channel by the local oscillator signal shifted in phase by 90°.

4. A pulse compression system as defined in claim 3, wherein said discrete phase correlation compression means includes means for compressing an FM pulse which varies linearly from frequency $f_1$ to frequency $f_2$; and wherein said system further comprises a local oscillator generator for generating said local oscillator signal at an intermediate frequency signal which is coherent with the original FM pulse waveform in the band of frequencies defined by $f_1$ and $f_2$.

5. A pulse compression system for receiving and compressing the echos of long frequency modulated (FM) pulse waveforms of electromagnetic energy propagated by a transmitter comprising:

means for transmitting a frequency modulated pulse which varies linearly from frequency $f_1$ to frequency $f_2$ over a pulse length T;

means for receiving an echo signal from said FM pulse signal and including means for converting the received signal to an intermediate frequency (I.F.) signal;

means for sampling the output signal from said receiving means and holding said sampled receiver output signal as its output until the next sampling time, wherein said sampling and holding means comprises first means for coherently heterodyning the I.F. signal from said converting means to an I baseband signal;

first sample and hold circuit for sampling said I baseband signal at the Nyquist rate for said baseband signal and holding this sample for a predetermined period of time;

first means for coherently modulating the sampled I signal back to an I.F. signal;

second means for coherently heterodyning the I.F. signal from said converting means to a Q baseband signal;

second sample and hold circuit for sampling said Q baseband signal at the Nyquist rate for the baseband signal and holding this sample for said predetermined period of time;

second means for coherently modulating the sampled Q signal back to an I.F. signal; and an adder circuit for adding the output I.F. signals from said first and second modulating means; and discrete phase correlation compression means for compressing a predetermined number of sampled outputs from said adder circuit of said sampling and holding means into a short pulse.

6. A pulse compression system as defined in claims 2, 1, 3, or 5, wherein said discrete phase shifting means comprises:

a delay line with a plurality of signal taps taken therefrom with a predetermined delay between each pair of taps;

a plurality of phase shifting elements, one element being located in each signal tap for shifting the signal in that tap by a predetermined phase shift such that when an echo from a transmitter FM pulse waveform is properly indexed in said delay line, then the outputs from said phase-shifting elements in said signal taps will all be in phase; and second adder means for adding the outputs from said signal taps to form a single pulse.

7. A pulse compression system as defined in claims 2, 3, or 5 wherein said linear FM pulse varies from frequency $f_1$ to frequency $f_2$ over a pulse length T where $f_2-f_1=p/T$ with p being the pulse compression ratio;

wherein said sampling and holding means includes means for sampling at the Nyquist rate which is p/T and holding this sampled signal for a time T/p between samples; and wherein said discrete phase shifting means comprises a tapped delay line with p signal taps with a delay of T/p between adjacent pairs of signal taps; and a plurality of phase shifting elements, one element located in each signal tap for shifting the signal in that tap by the amount $(p/T^2)(t)^2$ relative to the previous adjacent tap, where t is the time relative to the first sampled signal in said predetermined number of samples and is in increments of T/p.

8. A pulse compression system for compressing the echos from transmitted linear frequency modulated (FM) input signal pulses which vary linearly from frequency $f_1$ to frequency $f_2$ over the pulse length T where $f_2-f_1=p/T$ with p being the desired pulse compression ratio comprising:

means for receiving a linear FM pulse and converting said linear FM pulse to an I.F. signal;

first means for converting the I.F. signal from said receiving and converting means to baseband;

means for sampling the output signal from said converting means at the Nyquist sampling rate for the baseband and holding this sampled signal until the next sample is taken;

second means for converting said sampled signal from said sampling and holding means back to an I.F. signal; and discrete phase correlation compression means for compressing a predetermined number of outputs from said second converting means into a single pulse of a desired length, wherein when said linear FM echo pulse is properly indexed within said discrete phase shifting means, then it will compress the predetermined number of sampled outputs into a short pulse with a peak amplitude.

9. A pulse compression system as defined in claim 8, wherein said means for sampling and holding includes means for sampling at the rate p/T and for holding this sample for a time T/p; and wherein said discrete phase shifting means includes means for compressing p samples.

10. A pulse compression system as defined in claim 8, wherein said first converting means comprises:

first means for heterodyning the I.F. signal from said receiving and converting means with a coherent local oscillator (L.O.) signal to form an I baseband signal; and second means for heterodyning the I.F. signal from said receiving and converting means with said L.O.

signal shifted in phase by 90° to form a Q baseband signal; and wherein said second converting means comprises:

third means for heterodyning the sampled I baseband output from said sampling and holding means with said L.O. signal to form an I.F. signal;

fourth means for heterodyning the sampled Q baseband output from said sampling and holding means with said L.O. signal shifted in phase by 90° to form an I.F. signal; and first adder means for adding the output I.F. signals from said third and fourth heterodyning means.

11. A pulse compression system as defined in claim 10, further comprising a coherent local oscillator generator for generating said L.O. signal equal to the transmitted frequency $f_1$.

12. A pulse compression system as defined in claims 8 or 10, wherein said discrete phase shifting means comprises:

a delay line with a plurality of signal taps taken therefrom with a predetermined delay between each pair of taps;

a plurality of phase-shifting elements, one element located in each signal tap for shifting the phase of the signal in that tap by a predetermined amount $\pi(p/T^2)(t)^2$ relative to the previous adjacent tap, where t is the time relative to said predetermined number of sampled outputs and is in increments of T/p, such that when an echo from a transmitted pulse is properly indexed in said delay line, then the outputs from said phase-shifting elements in said signal taps will all be in phase; and compression adder means for adding the output from said signal taps such that when the output signals from said phase-shifting elements in said signal taps are in-phase then a short pulse with a peak amplitude will be obtained.

13. A pulse radar system comprising:

means for generating a frequency modulated (FM) pulse which varies linearly from frequency $f_1$ to frequency $f_2$ over a pulse length T where $f_2 - f_1 = p/T$ with p being a desired pulse compression ratio;

means for transmitting the linear FM pulse generated by said generating means at radio frequencies;

means for receiving a signal reflection from said transmitted linear FM pulse and converting this reflection signal to I.F.;

first means for converting said I.F. signal into I and Q baseband signals;

means for sampling said I and Q baseband signals at the Nyquist sampling rate p/T and holding this sampled signal for a time T/p between samples;

second means for converting and combining said sampled I and Q baseband signals back to an I.F. signal;

tapped delay means for delaying by incremental steps the sampled I.F. signal from said second converting means comprising a series of p-1 cascaded delay elements each with a delay of approximately T/p with a signal tap taken before each delay element and after the last delay element, with each signal tap line including a phase shifter set at a different predetermined phase shift such that when a sampled linear FM reflection signal is properly indexed in said tapped delay means, then the phase-shifted outputs from the taps are all in phase; and first means for adding the phase shifted outputs from each of said taps such that a pulse with a large peak amplitude is generated therefrom when a reflected linear FM signal is properly indexed within said tapped delay means.

14. A radar system as defined in claim 13, wherein said first converting means comprises:

first multiplier means for multiplying the I.F. signal from said receiving means with an intermediate frequency L.O. signal generated by said generating means in order to obtain an I signal;

first filter for passing only this I signal therethrough;

second multiplier means for multiplying the I.F. signal from said receiving means with said intermediate frequency L.O. signal phase shifted by 90° in order to obtain a Q signal; and second filter means for passing only this Q signal therethrough.

15. A radar system as defined in claim 14, wherein said sampling and holding means comprises:

a first sample and hold circuit for sampling said I signal from said first filter at the Nyquist rate and holding this sampled I signal; and a second sample and hold means for sampling said Q signal from said second filter at the Nyquist rate and holding this sampled Q.

16. A radar system as defined in claim 15, wherein said second converting means comprises:

third multiplier means for multiplying the sampled I signal from said first sample and hold circuit with said intermediate frequency L.O. signal;

fourth multiplier means for multiplying the sampled Q signal from said second sample and hold circuit with said intermediate frequency L.O. signal phase shifted by 90°; and second means for adding the output signals from said third and fourth multiplier means.

17. A radar system as defined in claim 13, wherein each of said phase shifters includes means for phase shifting the signal in its tap by an amount $\pi(p/T^2)(t^2)$ relative to the previous tap, where t is the time in increments of T/p relative to the first sampled signal in said p samples.

18. A radar processing method comprising the steps of:

generating a frequency modulated pulse which varies linearly from frequency $f_1$ to frequency $f_2$, over a pulse length T where $f_2 - f_1 = p/T$, with p being a desired pulse compression ratio;

transmitting said generated linear FM pulse at radio frequencies, receiving a signal reflection of said transmitted linear FM pulse and converting the reflection signal to an IF signal;

converting said IF signal into I and Q baseband signals;

sampling said I and Q baseband signals at the Nyquist sampling rate p/T and holding this sampled signal until the next sample;

converting said sampled I and Q baseband signals back to IF signals;

adding the converted I and Q sampled IF signals;

delaying by p-1 incremental steps the sampled and converted IF signal and tapping a signal before each incremental delay step and after the last delay step, said delay being approximately equal to T/p;

phase shifting each tapped signal at a different predetermined phase shift such that when a sampled signal is properly indexed across the p-1 delaying steps, then the phase-shifted outputs are all in phase; and adding the p phase shifted outputs such that a pulse with a large peak amplitude is generated when a reflected linear FM pulse is properly indexed.

19. A radar processing method as defined in claim 18, wherein said phase shifting step comprises the step of shifting the tapped signal by the amount $\pi(p/T^2)(t)^2$ relative to the previous adjacent tapped signal, where t is the time relative to the first sampled signal in the phase shifted outputs, and is in increments of T/p.

* * * * *